(12) United States Patent
Kimura

(10) Patent No.: US 12,040,573 B2
(45) Date of Patent: Jul. 16, 2024

(54) CONNECTOR HOUSING

(71) Applicant: Tyco Electronics Japan G.K., Kawasaki (JP)

(72) Inventor: Takeshi Kimura, Kawasaki (JP)

(73) Assignee: Tyco Electronics Japan G.K., Kawasaki (JP)

(*) Notice: Subject to any disclaimer, the term of this patent is extended or adjusted under 35 U.S.C. 154(b) by 270 days.

(21) Appl. No.: 17/723,029

(22) Filed: Apr. 18, 2022

(65) Prior Publication Data
US 2022/0239038 A1 Jul. 28, 2022

Related U.S. Application Data

(63) Continuation of application No. PCT/JP2020/036490, filed on Sep. 26, 2020.

(30) Foreign Application Priority Data

Oct. 18, 2019 (JP) .................................. 2019-190919

(51) Int. Cl.
*H01R 13/62* (2006.01)
*H01R 13/502* (2006.01)
(Continued)

(52) U.S. Cl.
CPC ..... *H01R 13/6272* (2013.01); *H01R 13/5025* (2013.01); *H01R 43/18* (2013.01)

(58) Field of Classification Search
CPC ............ H01R 13/6272; H01R 13/5025; H01R 43/18; H01R 13/504; H01R 13/502;
(Continued)

(56) References Cited

U.S. PATENT DOCUMENTS 7,544,081 B2* 6/2009 Lim ................... H01R 13/4361
439/352
8,926,355 B2* 1/2015 Heil ................... H01R 13/6275
439/352
(Continued)

FOREIGN PATENT DOCUMENTS

EP 2258024 B1 10/2015
JP H02186569 A 7/1990
(Continued)

OTHER PUBLICATIONS

Extended European Search Report dated Nov. 7, 2023, corresponding to Application No. 20877471.1-1201/4047758 PCT/JP2020036490, 5 pages.
(Continued)

*Primary Examiner* — Alexander Gilman
(74) *Attorney, Agent, or Firm* — Barley Snyder

(57) ABSTRACT

A connector housing includes a housing main body and a latch arm having a latch arm main body and a latch portion protruding from the latch arm main body. The latch arm main body is formed of a first material, extends like a cantilever from the housing main body, and is elastically deformable with respect to the housing main body. The latch portion is formed of a second material having a higher rigidity than the first material and latches with a latched member. A transition region between the first material and the second material has a continuously changing mixing ratio between the first material and the second material.

17 Claims, 2 Drawing Sheets

(51) Int. Cl.
*H01R 13/627* (2006.01)
*H01R 43/18* (2006.01)

(58) Field of Classification Search
CPC .................. H01R 13/46; H01R 13/639; B29C 45/0003; B29C 45/16; B29C 2045/1659
USPC ........................................................ 439/352
See application file for complete search history.

(56) References Cited

U.S. PATENT DOCUMENTS

| | | | | |
|---|---|---|---|---|
| 9,106,013 | B2* | 8/2015 | Boswell | H01R 13/6272 |
| 10,297,951 | B2* | 5/2019 | Zhao | H01R 13/04 |
| 10,355,414 | B1* | 7/2019 | Alvarado | H01R 13/639 |
| 10,784,621 | B1* | 9/2020 | Pusch | H01R 13/6272 |
| 11,296,462 | B2* | 4/2022 | Schneider | H01R 13/465 |
| 2006/0094281 | A1* | 5/2006 | Dang | H01R 13/6275 |
| | | | | 439/352 |
| 2007/0020986 | A1* | 1/2007 | Fry | H01R 13/6272 |
| | | | | 439/357 |
| 2007/0161284 | A1* | 7/2007 | Tyler | H01R 13/64 |
| | | | | 439/489 |
| 2008/0124966 | A1* | 5/2008 | Lim | H01R 13/641 |
| | | | | 439/357 |
| 2010/0248553 | A1* | 9/2010 | Bucher | H01R 13/6272 |
| | | | | 439/668 |
| 2016/0249147 | A1* | 8/2016 | Maalouf | H01R 43/26 |
| 2017/0012400 | A1* | 1/2017 | Herbrechtsmeier | H01R 13/629 |
| 2017/0102423 | A1* | 4/2017 | Maalouf | H01R 13/502 |
| 2017/0102424 | A1* | 4/2017 | Maalouf | H01R 13/502 |
| 2017/0222362 | A1* | 8/2017 | Zhao | H01R 43/20 |
| 2022/0239038 | A1* | 7/2022 | Kimura | B29C 45/16 |

FOREIGN PATENT DOCUMENTS

| | | |
|---|---|---|
| JP | H04137474 A | 5/1992 |
| JP | 8-1388 U1 | 9/1996 |
| JP | 11-260456 A | 9/1999 |
| JP | 2001351734 A1 | 12/2001 |
| JP | 2017177738 A | 10/2017 |
| JP | 2019102212 A1 | 6/2019 |

OTHER PUBLICATIONS

International Search Report and English translation, Application No. PCT/JP2020/036490, Dated: Nov. 24, 2020, 5 pages.
Written Opinion, Application No. PCT/JP2020/036490, Dated: Nov. 24, 2020, 3 pages.

* cited by examiner

CONNECTOR HOUSING

CROSS-REFERENCE TO RELATED APPLICATIONS

This application is a continuation of PCT International Application No. PCT/JP2020/036490, filed on Sep. 26, 2020, which claims priority under 35 U.S.C. § 119 to Japanese Patent Application No. 2019-190919, filed on Oct. 18, 2019.

FIELD OF THE INVENTION

The present invention relates to a connector housing provided with a latch arm.

BACKGROUND

Conventionally, a connector housing is widely adopted that is provided with a latch arm catching on a latched member of a mating housing or the like, for example, and preventing the latched member from being released (for example, see JPH4-137474A). This latch arm extends from a housing main body like a cantilever and has a latch portion catching on a latched member in a middle portion of the cantilever.

Additionally, JPH2-186569A discloses a connector housing provided with a housing main body composed of a hard material and a hinge composed of a soft material different from the hard material using a co-injection molding technique. JP2017-177738A discloses a molding apparatus injecting different resin materials from a plurality of gates (inlets) of a mold.

The latch arm is required to elastically deform when catching on the latched member of the mating housing or the like. Therefore, a material having a certain degree of softness is selected that allows the latch arm to be elastically deformed by a moderate operating force.

Shortening the length of the latch arm is considered in order to satisfy a requirement for size reduction of the connector housing. In that case, the latch arm is required to achieve a sufficient amount of elastic deformation regardless of its short length. In order to satisfy this, an even softer material will be adopted.

On the other hand, the latch portion, which is a portion of the latch arm that latches to the latched member, is required to retain its latching with the latched member even if an inadvertent force acts thereon, unless the inadvertent force exceeds a predetermined strength. Therefore, if a soft material is adopted, the latch portion may fail to retain the latching because the latch portion may be cracked or lost when an inadvertent force acts thereon.

Applying the co-injection molding technique disclosed in JPH2-186569A to the latch arm is conceivable for forming the latch arm main body and the latch portion from different materials suitable for them, respectively. However, co-injection molding will be more costly because the molding process is performed twice. Additionally, injection molding results in the latch arm main body and the latch portion being more likely to separate at their joint, and the latch portion may be lost when an advertent force is applied. Additionally, JP2017-177738A cited above does not contain any disclosure of a connector housing.

In view of these circumstances, there is a need to provide a connector housing with a latch arm suitable for elastic deformation while retaining the strength of a latch portion latching to a latched member.

SUMMARY

A connector housing includes a housing main body and a latch arm having a latch arm main body and a latch portion protruding from the latch arm main body. The latch arm main body is formed of a first material, extends like a cantilever from the housing main body, and is elastically deformable with respect to the housing main body. The latch portion is formed of a second material having a higher rigidity than the first material and latches with a latched member. A transition region between the first material and the second material has a continuously changing mixing ratio between the first material and the second material.

BRIEF DESCRIPTION OF THE DRAWINGS

The invention will now be described by way of example with reference to the accompanying Figures, of which.

DETAILED DESCRIPTION OF THE EMBODIMENT(S)

An embodiment of the present invention will be described below.

Figure 1:
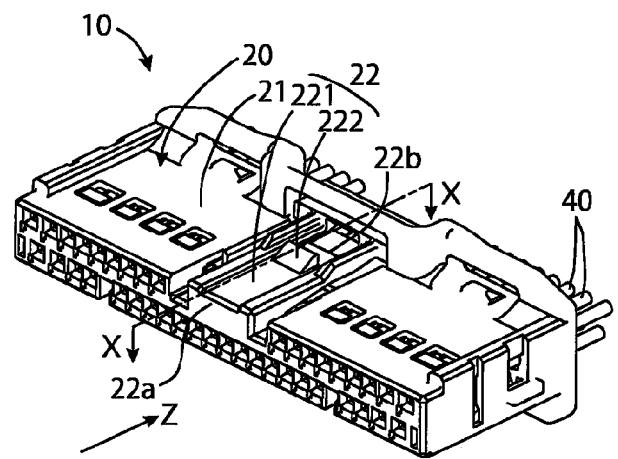
FIG. 1 is an isometric view of a connector according to an embodiment.
Figure 2:
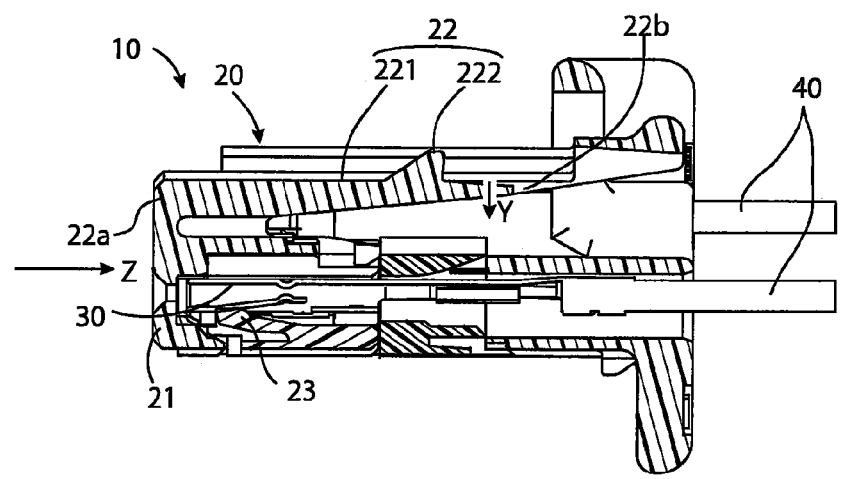
FIG. 2 is a sectional side view of the connector, taken along arrows X-X of FIG. 1.

A connector 10 according to an embodiment, as shown in FIGS. 1 and 2, has a connector housing 20 and a contact 30 (see FIG. 2) inserted in the connector housing 20.

In an embodiment, a cable 40 is connected to the contact 30, and the cable 40 extends out of the connector housing 20. It should be noted that only a portion of the cable 40 in the vicinity of the connector housing 20 is shown in FIGS. 1 and 2.

The connector housing 20 has a housing main body 21 and a latch arm 22, as shown in FIGS. 1 and 2. This connector housing 20 is equivalent to an example of a connector housing of the present invention. The latch arm 22 has a front end 22a connected to the housing main body 21 and extends rearward like a cantilever using the front end 22a as a fixed end. Further, this latch arm 22 is provided with a latch arm main body 221 extending between the front end 22a that is the fixed end and a rear end 22b that is a free end, and a latch protrusion 222 protruding in the middle of the latch arm main body 221. The latch protrusion 222 may also be referred to as a latch portion 222.

A mating connector is mated to the connector 10 in the direction of an arrow Z. In the process of the mating, the latch protrusion 222 is pushed by a housing of the mating connector. Thereupon, this latch arm 22 elastically deforms in the direction of an arrow Y shown in FIG. 2. Then, when they reach a completely-mated state, the latch arm 22 is released from the depression by the mating connector and returns to its original shape. Thereby, the latch protrusion 222 catches on a latched portion of the mating connector, and the mating connector is put into a locked state so as not to be easily released from this connector 10.

In an embodiment, a first kind of resin material not mixed with glass is used by way of example for the housing main body 21. The same first kind of resin material as for the housing main body 21 is also used for the latch arm main body 221 constituting the latch arm 22. On the other hand, a second kind of material having a rigidity increased in comparison with the first kind of resin material by mixing glass into the first kind of resin material is used by way of example for the latch protrusion 222 constituting the latch arm 22. Additionally, a material mixed with a pigment having a color making the latch portion 222 distinguishable at a glance from the housing main body 21 and the latch arm main body 221 may be used for this latch protrusion 222. It should be noted that, instead of mixing a pigment in the latch protrusion 222, a pigment may be mixed in the material of the housing main body 21 and the latch arm main body 221.

Figure 3:
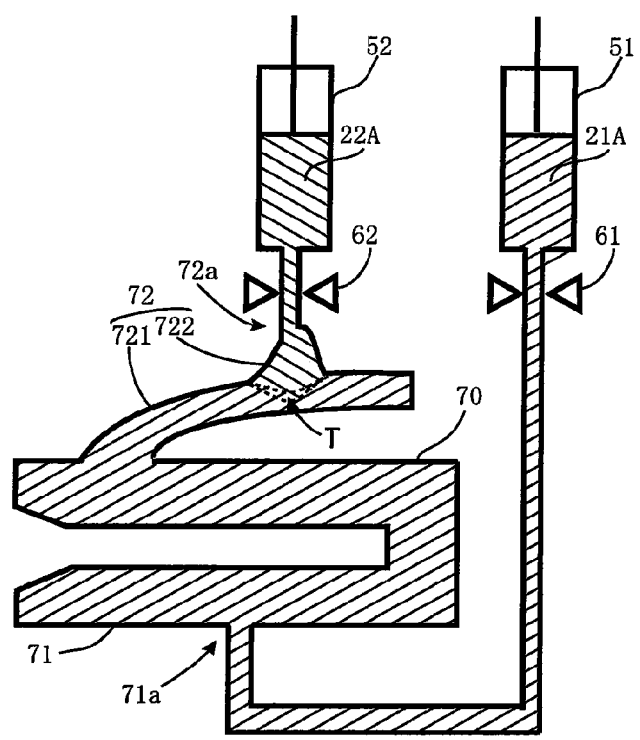
FIG. 3 is a schematic diagram of a manufacturing process for a connector housing constituting the connector shown in FIGS. 1 and 2.

FIG. 3 is a schematic diagram showing the outline of a manufacturing process for a connector housing constituting the connector shown in FIGS. 1 and 2.

A cavity 70 of a mold for manufacturing the connector housing 20 is shown in FIG. 3. This cavity 70 has a housing main body portion 71 molding the housing main body 21 and a latch arm portion 72 molding the latch arm 22. Furthermore, the latch arm portion 72 has a latch arm main body portion 721 molding the latch arm main body 221 and a latch protrusion portion 722 molding the latch protrusion 222. Further, this mold has inlets 71a, 72a connected to the housing main body portion 71 and the latch arm portion 72, respectively, from which materials are injected into the mold. The inlet 72a connected to the latch arm portion 72 is provided at a distal end of the latch protrusion portion 722.

Additionally, two cylinders 51, 52 are provided, as shown in FIG. 3. A first cylinder 51 is connected to the inlet 71a. Further, a first material 21A for the housing main body 21 and the latch arm main body 22 is stored in the first cylinder 51. A second cylinder 52 is connected to the inlet 72a. Further, a second material 22A for the latch portion 222 is stored in the second cylinder 52.

The timings to open valves 61, 62 are adjusted, and the materials 21A, 22A are injected into the cavity 70 of the mold. Thereupon, the first material 21A for the housing main body 21 and the latch arm main body 221 is injected into the housing main body portion 71 and the latch arm main body portion 721 of the cavity 70. Additionally, the second material 22A for the latch protrusion 222 is injected into the latch protrusion portion 722 of the cavity 70.

Thereupon, as shown in FIG. 3, a transition region T where these two materials 21A, 22A are mixed together is formed in a boundary region where the two kinds of materials 21A, 22A before curing come into contact with each other. This transition region T is a region where the ratio of the first material 21A constituting the latch arm main body 221 increases in the direction of the transition region T encroaching deeper into the latch arm main body portion 721, and the ratio of the second material 22A constituting the latch protrusion 222 increases toward the latch protrusion portion 722. The transition region T has a continuously changing mixing ratio between the first material 21A and the second material 22A.

In the present embodiment, the two kinds of materials 21A, 22A are first injected such that the two kinds of materials 21A, 22A come into contact with each other at the boundary between the latch arm main body portion 721 and the latch protrusion portion 722. Thereafter, outer regions of the injected materials 21A, 22A in contact with the mold cure to some extent, and then the pressure in the second cylinder 52 is increased to push the second material 22A into the latch arm main body portion 721. Thereupon, the transition region T encroaching in a substantially wedge-like shape, namely in a tapered shape, into the latch arm main body portion 721 and the latch arm main body 221 is formed. Thereby, the transition region T having a wider area can be formed as compared with the case where the two kinds of materials 21A, 22A are injected such that these two kinds of materials 21A, 22A come into contact with each other at the boundary between the latch arm main body portion 721 and the latch protrusion portion 722, and the strength of the latch portion 222 can be further increased.

In this manner, the connector housing 20 having the latch arm main body portion 221 formed of the first material 21A suitable for elastic deformation and the latch protrusion 222 formed of the second material 22A having a high rigidity is completed. Moreover, this connector housing 20, unlike a connector housing formed by co-injection molding, has the transition region T where the material changes continuously through the transition region T. Therefore, the materials 21A, 22A are integrated and an accidental loss of the latch protrusion 222 from the latch arm main body 221 is prevented with high reliability.

In an embodiment, the latch arm main body 221 and the latch protrusion 222 have different colors. Therefore, it can be easily confirmed whether the materials are properly molded and well mixed together in the transition region T.

It should be noted that using the materials having rigidities adjusted by either mixing or not mixing glass thereinto has been described here by way of example. However, this is an example, and the amounts of glass mixed therein may be changed, or different ingredients may be mixed therein. Alternatively, the resin materials themselves may be different resin materials.

Additionally, the latch arm latching with the housing of the mating connector has been chosen and described here. However, the latch arm in the context of the present invention is not limited to the latch arm latching with the housing of the mating connector. For example, the latch arm in the context of the present invention may be a latch arm (a contact lance 23 (see FIG. 2)) catching on the contact inserted into the connector housing and preventing the contact from being released.

What is claimed is:

1. A connector housing, comprising:
   a housing main body; and
   a latch arm having a latch arm main body and a latch portion protruding from the latch arm main body, the latch arm main body is formed of a first material, extends like a cantilever from the housing main body, and is elastically deformable with respect to the housing main body, the latch portion is formed of a second material having a higher rigidity than the first material and latches with a latched member, a transition region between the first material and the second material has a continuously changing mixing ratio between the first material and the second material.

2. The connector housing of claim 1, wherein the transition region extends into the latch arm main body.

3. The connector housing of claim 1, wherein the transition region has a tapered shape extending into the latch arm main body.

4. The connector housing of claim 1, wherein the latch arm latches with a mating housing mated with the connector housing.

5. The connector housing of claim 1, wherein the first material and the second material are different in color from each other.

6. The connector housing of claim 1, wherein the first material is formed of a resin material.

7. The connector housing of claim 6, wherein the second material is formed of the resin material mixed with a rigid material.

8. The connector housing of claim 7, wherein the rigid material is glass.

9. The connector housing of claim 6, wherein the resin material of the first material is a first resin material and the second material is formed of a second resin material different from the first resin material.

10. The connector housing of claim 1, wherein the latch arm latches with a contact inserted into the housing main body.

11. The connector housing of claim 1, wherein the latch arm has a front end fixed to the housing main body.

12. The connector housing of claim 11, wherein the latch arm has a rear end that is a free end.

13. The connector housing of claim 12, wherein the latch portion is disposed on the latch arm main body between the front end and the free end.

14. A latch arm for a connector housing, comprising:
a latch arm main body formed of a first material; and
a latch portion protruding from the latch arm main body and formed of a second material having a higher rigidity than the first material, a transition region between the first material and the second material has a continuously changing mixing ratio between the first material and the second material.

15. The latch arm of claim 14, wherein the transition region extends into the latch arm main body.

16. The latch arm of claim 14, wherein the transition region has a tapered shape extending into the latch arm main body.

17. The latch arm of claim 14, wherein the first material and the second material are different in color from each other.

* * * * *